United States Patent [19]

Krumel et al.

[11] 3,903,076

[45] Sept. 2, 1975

[54] PREPARATION AND PURIFICATION OF CELLULOSE ETHERS

[75] Inventors: Karl L. Krumel; James A. May; Frederick W. Stanley, Jr., all of Midland, Mich.

[73] Assignee: The Dow Chemical Company, Midland, Mich.

[22] Filed: June 26, 1974

[21] Appl. No.: 483,253

[52] U.S. Cl. ...... 260/232; 260/231 A; 260/233.3 A

[51] Int. Cl. ...................... C08b 11/00; C08b 19/00

[58] Field of Search ......... 260/232, 233.3 A, 231 A, 260/231 R

[56] References Cited

UNITED STATES PATENTS

| | | | |
|---|---|---|---|
| 2,067,946 | 1/1937 | Picton | 260/231 |
| 2,744,894 | 5/1956 | Benedict et al. | 260/231 R |
| 2,843,583 | 7/1958 | Voris | 260/232 |
| 2,879,268 | 3/1959 | Jullander | 260/233.3 A |
| 2,976,278 | 3/1961 | Paddison et al. | 260/231 A |
| 3,098,869 | 7/1963 | Borchert | 260/233.3 R |
| 3,347,847 | 10/1967 | Engelskirchen et al. | 260/232 |
| 3,451,999 | 6/1969 | Evans | 260/232 MC |
| 3,527,751 | 9/1970 | Gill | 260/232 |
| 3,709,876 | 1/1973 | Glomski et al. | 260/231 A |
| 3,761,465 | 9/1973 | Callihan | 260/231 A |

FOREIGN PATENTS OR APPLICATIONS

| | | | |
|---|---|---|---|
| 910,923 | 11/1962 | United Kingdom | 260/232 |

*Primary Examiner*—Ronald W. Griffin
*Attorney, Agent, or Firm*—Stephen Hoynak

[57] ABSTRACT

Polysaccharide ethers are made by reacting an alkali metal polysaccharide and an etherifying agent in a diluent containing a liquid hydrocarbon. The reaction mixture is subjected to azeotroping conditions which remove water and hydroxyl containing organic by-products, which interfere with cross-linking reaction of the crude polysaccharide ether with carbonyl compounds. The process is especially adaptable to water-solubilizible cellulose ethers with gel points of about 90°C or higher.

14 Claims, No Drawings

PREPARATION AND PURIFICATION OF CELLULOSE ETHERS

BACKGROUND OF THE INVENTION

Ethers of polysaccharides, including cellulose ethers, are commonly prepared by first mixing the polysaccharide with a strong alkali, e.g., an aqueous alkali metal hydroxide, and thereafter reacting the alkali metal containing derivative with an alkyl chloride, a monochloro carboxylic acid or an unsubstituted vicinal epoxide. Usually the alkyl chloride contains from 1 to about 4 C atoms, the chloro-acid contains from 2 to about 4 C atoms and the epoxide can contain from 2 to about 4 C atoms. The alkyl chlorides react to form alkyl ethers, the chloroacids form carboxyl alkyl ethers and the epoxides form hydroxyalkyl ethers. Mixtures of an alkyl chloride and a vicinal epoxide form derivatives having both alkyl ether and hydroxyalkyl ether groups on the polysaccharide. Similarly a mixture of an alkyl chloride and a chloro carboxylic acid will result in the formation of both alkyl ether and carboxyalkyl ether groups on the polysaccharide. If desired, all three types of alkylating agents can be mixed for reaction with the polysaccharide to form derivatives having alkyl, carboxyalkyl and hydroxyalkyl ether groups on the polysaccharide.

The reaction can be effected in a "dry" process wherein the alkali metal cellulose, after preparation, is reacted with liquid, non-aqueous reactants mentioned above, in quantities insufficient to make a slurry, or it can be effected in the presence of small quantities of water, with or without the presence of an inert diluent.

U.S. Pat. No. 2,067,946, describes a method of preparing ethyl cellulose by mixing cellulose (of certain specified dimensions, compactness and bulk density), alkali, water, an etherifying agent and a diluent in a reactor and heating the mixture while agitating vigorously. The cellulose ether is then isolated and purified by "known methods". The product so formed is said to be completely soluble in toluene-alcohol. Among the inert diluents listed are benzene, toluene, xylene, chlorobenzene, ethyl benzene, dibutyl ether, dipropyl ether, dioxane, diisopropyl ether, Hi-flash naphtha and diethyl ether.

U.S. Pat. No. 2,976,278 discloses a procedure for making water soluble salts of carboxymethyl cellulose ether. Cellulose is added to a two phase mixture of a lower alcohol and an aromatic liquid hydrocarbon. A caustic solution is added while the mixture is stirred. Then monochloroacetic acid or its alkali metal salt is added. Upon completion of the reaction, excess alkali is neutralized and the salt of carboxymethyl cellulose is recovered.

U.S. Pat. No. 2,744,894 teaches that hydroxyalkyl ethers of polysaccharides can be prepared by reaction of a polysaccharide with alkali and a vicinal epoxide of 2 to 4 C atoms in the presence of a mixture of organic liquids, at least one of which dissolves substantial amounts of alkali. The polysaccharides and the hydroxyalkyl derivatives are insoluble in the mixture of liquids. One of the liquids which boils above 65°C, and preferably above 85°C, can be a benzenoid hydrocarbon, an alkane, a monoketo or a monoether derivative of the alkanes. The quantity of the above mentioned liquid can range from 70 percent to 95 percent. The remaining 5 percent to 30 percent is a primary or secondary monohydric alcohol having an alkoxy group of 1–4 C atoms. Preferred are the secondary alcohols. After etherification the solids are separated from the liquid, and the solids are washed with suitable solvents, preferably acetone and isopropyl alcohol. Excess acid is neutralized and the product is dried in air at 50°–60°C or under vacuum.

U.S. Pat. No. 3,347,847 describes a process for making and purifying hydroxyethyl cellulose by dispersing cellulose in a secondary or tertiary aliphatic alcohol or a ketone which is at least partially miscible with water, adding aqueous alkali, then adding ethylene oxide. After etherification the mixture is acidified and treated with glyoxal to cross-link the cellulose ether and render it insoluble in water. The product is washed with water at 20°–30°C, while maintaining a pH of 2–6. Thereafter the product is dried.

A process closely related to the above is disclosed in U.S. Pat. No. 3,527,751, which discloses that cross-linking of the hydroxyalkyl cellulose is effected with more than 2.5 percent of glyoxal, based on the cellulose ether, in a liquid medium which can be isopropylalcohol or acetone.

U.S. Pat. No. 3,709,876 describes a procedure for making hydroxyethyl methyl cellulose with 1.0 to 3.5 hydroxyethyl molar substitution, 0.6 to 1.6 methoxyl substitution and a total degree of substitution of 1.4 to 2.4, by reacting an alkali cellulose with methyl chloride and ethylene oxide in an excess of methyl chloride as diluent. The resulting cellulose ether is purified by cross-linking with glyoxal and washed with water or aqueous acetone.

None of the prior art discloses the steps of removing at least a portion of the water and hydroxyl containing organic by-products from the system by azeotropic distillation, nor the step of reacting the etherified polysaccharide in a liquid, acidified medium containing a liquid aromatic hydrocarbon.

SUMMARY OF THE INVENTION

This invention comprises a process for preparing and purifying ethers of polysaccharides. The polysaccharide ethers are soluble in water containing an alkaline material. It is especially applicable for preparing polysaccharide ethers which are non-gellable below about 100°C, but it can also be used for preparing polysaccharide ethers with gel points lower than 100°C, such as methyl celluloses.

The process steps comprise

1. In a method of preparing ethers of polysaccharides by reacting an alkali metal polysaccharide with at least one member of the group:
   a. a $C_1$–$C_4$ alkyl monochloride,
   b. a $C_2$–$C_4$ vicinal epoxide, and
   c. a $C_2$–$C_4$ monochlorocarboxylic acid or alkali metal salt thereof, in the presence of a liquid organic diluent at a temperature of from about 50° to 155°C and thereafter neutralizing excess alkali, cross-linking the etherified polysaccharide and washing it with water, the improvement comprising:

A. Using as the organic diluent a liquid containing from about 20 to 100 percent by weight of a hydrocarbon having a boiling point of from about 60° to about 155°C, B. Removing water and at least a portion of water-soluble volatile hydroxyl containing by-products from the neutralized reaction mixture by azeotropic distillation, C. Cross-linking the etherified polysaccharide in the presence of the liquid diluent with an unsubstituted monoaldehyde having 1 to 6 C atoms or an unsubstituted dialdehyde of from 2 to 6 C atoms.

D. Washing the cross-linked product with water at a temperature of from about 0° to about 30°C.

DETAILED DESCRIPTION OF THE INVENTION

The polysaccharide can be any starch or cellulosic material in the form of a fine powder, linters or powdered wood pulp.

The alkali metal polysaccharide can be prepared before use in the process by known means such as spraying the polysaccharide with a concentrated caustic, e.g., 30–50 percent by weight NaOH or KOH, and protecting against oxidation, or it can be made in situ, by adding the concentrated caustic to the finely divided polysaccharide and stirring to keep the polysaccharide in suspension.

The hydrocarbon diluent can be $C_6$–$C_9$ alkane or cycloalkane having 5–6 C atom rings and 6–9 C atoms or a liquid aromatic hydrocarbon. The alkanes include both straight and branched chain hydrocarbons having boiling points of from about 60° to about 155°C. They have at least 4 carbon atoms and up to 9 C atoms in a chain.

The aromatic hydrocarbons can be benzene, toluene, ethyl benzene, one or a mixture of xylenes or cumene. These aromatic hydrocarbons have boiling points of from about 80°C to 152°–153°C. They have from 6 to 9 C atoms and 1 to 2 alkyl groups totaling 3 C atoms.

The preferred hydrocarbons are hexane, benzene and toluene. Most preferred is toluene.

All these hydrocarbons form azeotropes with water and some of the hydroxyl containing by-products (alcohols and monoethers of glycols) which are formed during the etherification step.

The ketones which can be used include acetone, methyl ethyl ketone, diethyl ketone, methyl propyl ketone, or methyl butyl or isobutyl ketones.

The alcohols which can be used are isopropyl, secondary butyl, t-butyl and other secondary or tertiary monohydric alkanols higher than butyl having up to 6 C atoms.

The liquid hydrocarbon must constitute about 20 weight percent of the diluent, and the ketone or alcohol may constitute 0 to about 80 percent. It is to be understood that the hydrocarbon can constitute 100 percent of the organic diluent, if desired.

The ratio of diluent can range from about 5 to about 16 parts by weight per part of polysaccharide. If the diluent is less than 5 parts by weight per part of polysaccharide, the mixture requires a large amount of power for stirring. There is no technical upper limit on the amount of diluent, but for practical purposes about 10–12 parts of diluent per part of cellulose is about the practical maximum. Ratios above 10 to 1 tend to reduce the amount of etherified polysaccharide per batch in a given reactor.

Preferred is a ratio of 8–14 parts and most preferred is a ratio of 10–14 parts of diluent per part of polysaccharide.

The amount of NaOH should be sufficient to obtain the desired degree of etherification of the polysaccharide. For cellulose from 0.3 to 1.3 parts by weight of 50 weight percent aqueous NaOH, or the equivalent for KOH, should be used. The preferred amount is from 0.4 to 1.0 and most preferred is 0.4 to 0.9 parts of 50 percent NaOH per part of cellulose, or the equivalent amount of KOH.

The amount of etherifying agent must be sufficient to react with the desired number of hydroxyl groups, preferably on the polysaccharide. When a chloro-alkanoic acid is employed sufficient alkali should be used to neutralize the acid. When a cellulose ether having both methoxy and hydroxyethyl groups is made with a mixture of 0.55 to 0.95 parts by weight of methyl chloride and 0.9 to 1.5 parts by weight of ethylene oxide per part of cellulose and 0.9 to 1.3 parts of 50 weight percent aqueous NaOH, by the process of this invention the product has a high viscosity at 2 percent in water and it also has excellent enzyme resistance.

Other etherifying reactants which can be used include ethyl chloride, the monochloro propanes and monochloro butanes.

The epoxides include ethylene oxide, 1,2-propylene oxide, and 1,2-butylene oxide.

The monochloroalkanoic acid or salt can be any carboxylic acid having from 2 to 4 C atoms. These include the monochloro substituted acetic, propionic and butyric acids.

The presence of the diluents permits the reaction to be carried out over a wide range of temperatures, and particularly at temperatures considerably higher than is possible when a diluent such as acetone or isopropyl alcohol is used. Thus, temperatures of 50° to 150°C are operable depending on the reactants. Preferably, the temperature is adjusted after the reaction to permit removal of water by azeotropic distillation. The removal of water after the etherification stage serves to mitigate balling or coalescing of the polysaccharide-ether. The particles of polysaccharide after the etherification step are approximately the same size as they were prior to etherification. A temperature range of from about 55°C to about 150°C is operable, but a preferred etherification temperature is from about 60° to about 90°C. During this part of the reaction from about 20 to about 100 percent, preferably from about 50 to about 90 percent of the water in the system is removed.

The reaction is preferably carried out in a closed system if volatile etherification reactants are used, but it can also be carried out in an open system at atmospheric pressure with effective reflux condensation of the volatile liquid reactants.

The reaction is exothermic and the diluent provides for better heat transfer and uniformity of temperature throughout the mixture. In addition there is a much more even distribution of etherification reactants in the mixture which aids in the more even etherification of the polysaccharide and more even distribution of the acidifying and cross-linking agents after the etherification is complete.

After etherification the mixture is cooled below about 85°C and then acidified in liquid state to a pH of from about 2–6 and preferably 4 to 6 with either a strong mineral acid or an organic carboxylic acid having a pKa value of about 5 or less. Representative acids include HCl, $H_2SO_4$, $H_3PO_4$, formic, acetic, glycolic, lactic, succinic or citric acid. Preferred are formic or acetic acids and most preferred is formic acid.

After the acidification the etherified polysaccharide is cross-linked with an aldehyde which can be a mono- or dialdehyde soluble in the diluent. Representative aldehydes include formaldehyde, glyoxal, succinaldehyde or other $C_2$–$C_6$ dialdehydes of which malonaldehyde pyruvaldehyde and adipaldehyde are representative. Formaldehyde requires careful pH control. Glyoxal reacts rapidly and the cross-linking is reversible, so that it is the preferred cross-linking reactant. The amount of cross-linking reactant in solution based on the weight of polysaccharide can vary from about 0.02 to about 10 percent by weight. However, the preferred range is from about 3 to about 7 percent. When glyoxal is the cross-linking agent a concentration of from about 3.3 to about 6 parts by weight based on the polysaccharide are preferred. The amount of glyoxal is regulated to provide resistance to solution in water for a period of 1 to 120 minutes in water having a temperature of 0° to 30°C.

The cross-linked etherified polysaccharide is then separated from the diluent by filtration, centrifugation or any other known means of separating solids from liquids.

The separated solids are washed with water at 0° to 30°C, preferably by slurrying and then filtering or centrifuging. Washing can be continued until a desired low salt concentration is obtained in the final product. Salt concentration as low as 0.05 percent are readily attainable.

The washed polysaccharide ether is then dried by known means at a temperature of 70° to 120°C. The preferred means for drying is by use of heated, forced air dryer.

The process of this invention has the following advantages:

1. improved heat transfer and thus good control of the reaction temperature during the etherification step;
2. improved and more uniform contact of the cross-linking agent with the etherified polysaccharide;
3. the product retains substantially its original size and form, which facilitates purification and salt removal;
4. the washed product, because of its uniform, finely divided form, dissolves faster and more uniformly in aqueous alkaline media;
5. neither the polysaccharide nor its ether derivative is in a greatly swollen (or hydrated) or in a dissolved state at any time during the process; and
6. the azeotroping step serves to remove water and some by-products which interfere with cross-linking. The latter are hydroxyl containing ingredients, such as monoethers of glycols, glycols and alkanols. This step also removes at least a portion of diethers of glycols. The process of this invention is especially suitable for preparing hydroxyethyl methyl cellulose ethers of the type disclosed and claimed in U.S. Pat. No. 3,709,876.

The etherified polysaccharides are useful for preparing adhesives with water, they are useful as color developers, flow and leveling improvers in latex paints and as thickeners for a variety of food products.

SPECIFIC EMBODIMENTS OF THE INVENTION

The following examples are intended to illustrate but not limit the invention. Unless otherwise stated all parts and percentages are by weight.

EXAMPLE 1

Twenty-five pounds of ground cellulose were mixed with 29.5 pounds of 50 weight percent aqueous NaOH under nitrogen to preserve viscosity. The material was transferred to a pressure reactor, which was evacuated and flushed with nitrogen. Two hundred fifty pounds of toluene, purged with nitrogen to remove dissolved oxygen, were added.

Then 20.8 pounds of methyl chloride were charged to the reactor and heated to 90°C. During this heating step, ethylene oxide was added by metering at uniform rate. A total of 37.5 pounds of ethylene oxide were introduced. The reaction temperature rose to 90°C and was held there for the remainder of the reaction period, (about 3 hours). The mixture was then cooled to 70°C, vented and a sample was taken for analyzing residual NaOH. Sufficient formic acid was added to neutralize the residual NaOH and then 9000 ml. of water were removed by azeotropic distillation. This amount of water is about 90 percent of that theoretically present in the mixture.

The mixture was cooled to 70°C and 0.3 pound of 90 weight percent formic acid and 4 pounds of 40 percent aqueous glyoxal were added. The pH of the mixture was 4–6. The reaction with glyoxal was continued for 30 minutes at 70°C. Thereafter, the mixture was removed from the reactor and the toluene was separated by centrifugation. The dump mass weighed 80 pounds and had a water content of 3–4 percent. A 1 kg. sample was washed three times, each time with a liter of water, at a temperature of 20°–25°C. Thereafter, the product was dried and ground. The product was a white, water insoluble powder, which dissolved in water when base was added. A 2 percent solution in water had a viscosity of 22,000 cps. This product had a methoxyl degree of substitution of 1.3 and a hydroxyethyl molar substitution of 1.88.

EXAMPLE 2

Twenty-five pounds of finely ground cellulose were mixed with 27 pounds of 50 weight percent aqueous NaOH, under a nitrogen atmosphere. The alkali cellulose was placed in a pressure reactor containing 250 pounds benzene which had been evacuated and flushed with nitrogen. Thirteen pounds of methyl chloride were charged to the reactor and the mixture was heated to 90°C and maintained at that temperature for 2 hours. Then, 37.5 pounds of ethylene oxide were added continuously over a 2 hours period. The temperature was maintained at 90°C for an hour after completion of the addition of the ethylene oxide. After completion of the reaction, neutralization, azeotroping, acidification, cross-linking, washing and drying steps were carried out as in example 1, but the azeotroping temperature was 70°–80°C.

EXAMPLE 3

Twenty-five pounds of ground cellulose were mixed with 28 pounds of 50 percent caustic in a ribbon blender. The alkali cellulose was loaded into a 70 gallon vertically stirred pressure vessel. The reactor was evacuated and flushed with nitrogen to remove all the oxygen. Then 250 pounds of toluene and 20 pounds of methyl chloride were added and the reactor was heated to 90°C over a period of one hour. During the heat up period, ethylene oxide was metered into the reactor at a uniform rate. A total of 42 pounds were added. After the ethylene oxide addition, the reactor was held at 90°C for an additional 30 minutes. Enough formic acid was added to neutralize any residual caustic. The reactor temperature was increased to 115°C and 9 liters of water were removed by azeotropic distillation. The reactor was cooled to below 75°C and 4 pounds of 40 percent glyoxal and enough formic acid to adjust the pH to between 4–5 were added. The reactor was cooled to room temperature and dumped. The excess toluene was removed by centrifugation. The initial salt concentration was 20 percent. After two water washes, the salt level was 0.5 percent and after three washes it was 0.05 percent. The cross-linked sample was stable in 20°C water for 1 hour before it started to dissolve. The product was dried, giving a 95 percent recovery. The product was a white insoluble powder which dissolved in water when base was added. It has a methoxyl degree of substitution of 1.3 and a hydroxyethyl molar substitution of 1.8. The viscosity of a 2 percent aqueous solution was 36,700 cps.

EXAMPLE 4

It is also possible to form an alkali metal cellulose in the reaction diluent and then add the etherification ingredients.

A mixture of 3980 parts toluene, 392 parts of solid NaOH and 145 parts water was purged with $N_2$. The mixture was then heated to 80°C with stirring for 1 hour. Then 400 parts of ground cellulose were added, the mixture was spurged with $N_2$ and heated for an hour. The mixture was cooled to room temperature after which 594 parts of methyl chloride and 101 parts of propylene oxide were added and then heated to 90°C and held for 4 hours. After completion of the reaction, the procedure for neutralizing excess acid, azeotroping water, adjusting pH, cross-linking with glyoxal and washing is the same as that described above.

The finished product contained 31.44 percent $-OCH_3$ and 9.93 percent

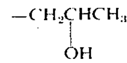

groups. It could be dissolved in alkaline water.

EXAMPLE 5

Two hundred parts of ground cellulose were mixed with 266 parts of 35 percent NaOH in a blender in an $N_2$ atmosphere and then transferred to a reactor. The reactor was evacuated and flushed with nitrogen three times. Then 1200 parts of benzene and 143 parts of methyl chloride were added and the mixture was heated to 45°C for 1 hour. A total of 300 parts of ethylene oxide in 50 part increments were added at 10 minute intervals. The reaction was then carried out at 55°C for one hour and at 75°C for another hour. The neutralization, azeotroping, acidification with formic acid, cross-linking with glyoxal and washing steps are carried out as described in the above examples. A 2 percent solution in water had a viscosity of 10,000 cps, a DS value of 0.64 and MS value of 1.50.

EXAMPLE 6

To 200 parts of ground cellulose were added 240 parts of 50 weight percent NaOH in a blender and mixed under nitrogen. The mixture was transferred to a reactor and 400 parts toluene and 1600 parts acetone were added. The reactor was evacuated and purged with nitrogen to remove substantially all the oxygen. Then 140 parts of methyl chloride were added and the mixture was heated. When the temperature reached 55°C, 300 parts of ethylene oxide at a rate of 2.5 parts per minute were added. The reaction temperature during addition of most of the ethylene oxide was 90°C. The mixture was heated to 105°C for 30 minutes after addition of ethylene oxide was complete. The steps of neutralizing, azeotroping water-acetone-toluene, acidifying to pH 4–6, cross-linking with glyoxal and washing are carried out as described above. The product had a DS of 1.19 and an MS of 1.98. The methyl chloride efficiency was 53 percent and ethylene oxide efficiency 43.5 percent.

EXAMPLE 7

A mixture of 2835 parts of hexane, 1665 parts of t-butanol and 457 parts of 49 percent NaOH was heated at 60°C for 15 minutes, with agitation. Then 400 parts of ground wood pulp were added, and the mixture was purged with $N_2$ and cooled. Seven hundred fifty parts of methyl chloride were added and the mixture was heated. When the temperature reached 55°C, 600 parts of ethylene oxide at a rate of 6.67 parts per minute were added. The reaction was run for 4 hours at 90°C. The mixture was then cooled to 75°C, neutralized, and water was azeotroped. The mixture was then acidified and cross-linked by the procedure described above. It was washed and dried. The finished product had 28.3 percent $-C_2H_4OH$ and 14.6 percent $-OCH_3$. The DS was 1.17 and MS 1.60.

EXAMPLE 8

An alkali cellulose was prepared by spraying 477 parts of ground cellulose with 487 parts of 50 weight percent of NaOH. The alkali cellulose was transferred to a reactor, evacuated and purged with nitrogen. Then 5800 parts of toluene were added. The mixture was heated to 95°C. and 715 parts of ethylene oxide were added over an 8 hour period. After cooling, the reaction mixture was neutralized with acetic acid. Azeotroping was effected at about 95°C. and then the hydroxyethyl cellulose was cross-linked with 40 percent aqueous glyoxal, in an amount sufficient to provide 10 weight percent of glyoxal based on the unreacted cellulose. The hydroxyethyl cellulose was washed with cold water, filtered and dried.

The etherified cellulose had an MS of 2.52. A 2 weight percent solution in water had a viscosity in excess of 3000.

We claim:

1. In a method of preparing ethers of polysaccharides by reacting an alkali metal polysaccharide selected from the class of sodium starch, sodium cellulose, potassium starch and potassium cellulose with at least one member selected from the group consisting of a. a $C_1$–$C_4$ alkyl monochloride, b. a $C_2$–$C_4$ vicinal epoxide, and c. a $C_2$–$C_4$ monochlorocarboxylic acid or alkali metal salt thereof, in the presence of a liquid organic diluent at a temperature of from about 50° to 155°C and thereafter neutralizing excess alkali, cross-linking the etherified polysaccharide and washing it with water, the improvement comprising, A. Using as the organic diluent a liquid containing from about 20 to 100 percent by weight of a hydrocarbon having a boiling point of from about 60 to about 155°C and from 80 to 0 percent by weight of a $C_3$ to $C_6$ ketone or a $C_3$ to $C_6$ secondary or tertiary monohydric alkanol, the weight ratio of diluent to polysaccharide being from about 8 to about 14 to 1.

B. Removing at least a portion of the water and volatile hydroxyl containing by-products from the neutralized reaction mixture by azeotropic distillation, C. Crosslinking the etherified polysaccharide in the presence of the liquid diluent with from about 0.2 to about 10 weight percent based on the polysaccharide of an unsubstituted monoaldehyde having 1 to 6 C atoms or an unsubstituted dialdehyde of from 2 to 6 C atoms at a pH of from about 2–6, and D. Washing the crosslinked product with water at a temperature of from about 0° to about 30°C.

2. The method of claim 1 in which the hydrocarbon is an aromatic hydrocarbon having 6–9 C atoms, free of nonaromatic unsaturation.

3. The method of claim 2 in which the sole organic diluent is benzene.

4. The method of claim 2 in which the sole organic diluent is toluene.

5. The method of claim 2 in which the sole organic diluent is cumene.

6. The method of claim 2 in which the organic diluent is xylene.

7. The method of claim 1 in which the diluent is a mixture of from about 50 to about 100 weight percent of said hydrocarbon and 0 to 50 weight percent of said ketone.

8. The method of claim 1 in which the hydrocarbon is toluene and the ketone is acetone.

9. The method of claim 1 in which the diluent is a mixture of from about 50 to about 100 weight percent hydrocarbon and from about 0 to about 50 weight percent of a $C_3$ - $C_6$ secondary or a $C_4$ - $C_6$ tertiary alkanol.

10. The method of claim 9 in which the hydrocarbon is toluene and the alcohol is t-butanol.

11. The method of claim 9 in which the hydrocarbon is hexane and the alcohol is t-butanol.

12. The method of claim 1 in which the acidifying ingredient is formic acid and the cross-linking agent is glyoxal.

13. The method of claim 12 in which the alkali metal polysaccharide is a sodium cellulose, the diluent is toluene in a weight ratio of about 10–12 parts per part of cellulose, the etherifying ingredients are methyl chloride and ethylene oxide in a weight ratio of about 0.8 pound methyl chloride and 1.7 pounds of ethylene oxide per pound of cellulose, the reaction temperature is 55 to 90°C, the neutralizing acid is formic acid, azeotroping is effected at about 115°C to remove about 90 percent of the water, the etherified product is crosslinked at a pH of 4–5 with about 0.6 weight percent based on the cellulose of glyoxal, and washing with water is effected at 20°–25°C.

14. The method of claim 1 in which the etherified polysaccharide is hydroxyethyl methyl cellulose having a gel point greater than about 100°C, a hydroxyethyl molar substitution of about 1 to 3.5, a methoxyl degree of substitution of about 0.6 to 1.6 and a total degree of substitution of about 1.4 to 2.4, said hydroxyethyl methyl cellulose being prepared by reacting (A) an alkali cellulose made from about 1.2 to 3.0 moles of 35–70 percent aqueous NaOH per mole of cellulose with (B) 1.6 to 6.0 moles of methyl chloride per mole of cellulose at 40°–55°C and (C) from 3.4–6.8 moles of ethylene oxide per mole of cellulose while maintaining the temperature at about 55°–90°C.

* * * * *